Nov. 2, 1926.  
C. S. RAILSBACK  
1,605,464
IDENTIFICATION SYSTEM FOR MOTOR DRIVEN VEHICLES
Filed Oct. 6, 1923
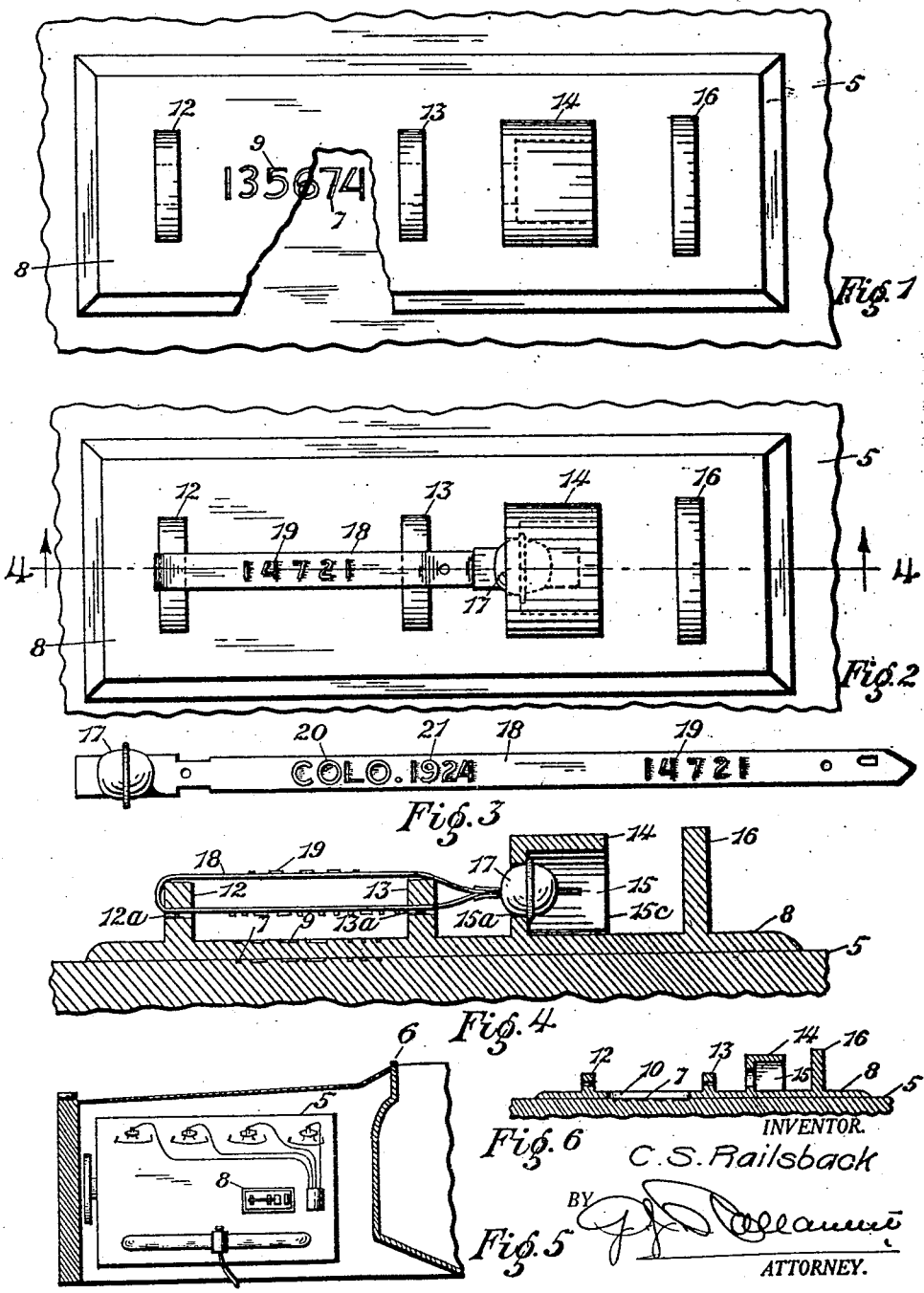
INVENTOR.
C. S. Railsback
BY
ATTORNEY.

Patented Nov. 2, 1926.

1,605,464

UNITED STATES PATENT OFFICE.

CHARLES S. RAILSBACK, OF COLORADO SPRINGS, COLORADO.

IDENTIFICATION SYSTEM FOR MOTOR-DRIVEN VEHICLES.

Application filed October 6, 1923. Serial No. 667,043.

This invention relates to an identification system for motor driven vehicles and its primary object is to provide a simple and efficient system of applying to an automobile or other motor vehicle, a removable license number or other distinctive identification data, in such a manner as to positively prevent fraudulent alteration or replacement thereof. Another object of the invention is to provide means for preventing alteration of the factory number which usually is stamped or cast in the engine body or other fixed part of the vehicle, and a further object resides in providing a system of the character described which is under control of the government of the State, county or municipality in which the vehicles are licensed, and which may be applied without loss and even at a profit to both the community and the owners of the cars.

By the use of my invention, the sale of a stolen automobile under a fraudulently changed engine number or license number is prevented and a legal transfer of the property can be accomplished only by the rightful owner of the car and with the knowledge and consent of the proper authorities of the community in which the transaction is conducted.

My improved system, as will hereinafter be described in detail with reference to the accompanying drawings, consists briefly, in providing the engine body or other substantial and permanently fixed part of a motor vehicle with means for the application of a seal of the type commonly used in locking the doors of freight cars. Seals of this type consist of a pliable strap fastened at one end to a housing which contains a lock mechanism adapted to secure the free end of the strap after the latter has been doubled and passed through an opening of the fastening to which it is applied. For the purpose of the present application, the license number of the car, the name of the State issuing the license, the year of issue, or other identification marks are stamped in the strap of the seal and the means on the vehicle to which the seal is fastened are so constructed as to prevent tampering with the lock or otherwise removing or changing the seal without immediate discovery of the fraud upon inspection. It is preferred to arrange the fastening means on the engine body or other part of the car so that the strap of the seal will cover the number of the car stamped or cast in said body or other part, and thereby provide a protection against alteration or mutilation of the number for the purpose of preventing identification of the vehicle after it has been stolen.

The seals marked with the license number, name of State and other distinguishing marks as hereinbefore described, are applied to the vehicles by an official of the State government at the same time that the ordinary license tag is issued. The license number, engine number, make of car, owner's name and other data are officially recorded and the owner receives an abstract of title under the seal of the Government, legally establishing his ownership of the licensed car.

The seal applied as hereinabove described prevents alteration of the license number or the car number with fraudulent intent and when the owner desires to dispose of his property to another he can do so only by application to the proper authorities who make a record of the change of title and issue an abstract thereof to the purchaser. It will thus be evident that a car identified by my system can be disposed of only by the person in whose name the property has been recorded and since alteration of either the license number or the engine number is practically impossible, any attempt to a dispose of a stolen automobile will lead to immediate discovery of the deceit. Inasmuch as the automobile insurance companies will be justified in reducing the amount of the premium on cars equipped with my improved identification system, it is apparent that the owners of the cars will be at no expense in obtaining the protection even though the license fees are increased to cover the cost of the seals and the time expended in their application and in recording the ownership of the licensed property.

In the drawings in the several views of which like parts are similarly designated, Figure 1 represents a face view of an engine body or other fixed part of a motor vehicle equipped with the means for fastening the seal;

Figure 2, a similar view of the same parts with the seal in place;

Figure 3, a face view of the seal in its original condition;

Figure 4, a section taken on the line 4—4, Figure 2;

Figure 5, a sectional elevation of the front part of an automobile body, showing the seal as applied to the engine, at a greatly reduced scale of drawing, and Figure 6, a reduced section similar to Figure 4, showing a modification in the construction of the seal fastening.

In the form of the invention shown in the drawings the lugs and other members included in the seal fastening have been shown as forming an integral part of a plate which is secured to the engine body or other part of the vehicle, by welding, riveting or other method which prevents its removal without partial or entire destruction, but I desire it understood that on cars manufactured after the system has gone into effect, these lugs and other members of the fastening can be formed directly on the engine wall as an integral part thereof. Inasmuch as the last mentioned method of producing the seal fastening does not change the construction or the relative position of the members thereof, it has not been illustrated otherwise than by the cross-sectional shading in Figure 4.

Referring in detail to the drawings, 5 designates the engine of a motor vehicle 6 shown in Figure 5. The wall of the engine bears the vehicle number as indicated at 7, and as stated hereinbefore, it is desirable that the seal fastening be arranged relative to this number so that the strap of the seal in its operative position shall cover the number and thereby prevent its alteration.

In the construction shown in the drawings the members of the fastenings are formed integrally on a plate 8 which is irremovably fastened to the wall of the engine by spot welding or other suitable means and since this plate will cover the number on the engine, it is necessary that either the number be repeated on the plate in stamped or otherwise formed characters as indicated at 9, or that the plate be provided with an opening to expose the number on the engine as shown at 10 in Figure 6.

The members of the fastening, formed on the plate, consist of two lugs 12 and 13 having alined slots 12$^a$ and 13$^a$ to receive the strap of the seal, a third lug 14 having a pocket 15 provided at one side with an aperture 15$^a$ in alinement with the slots 12$^a$ and 13$^a$, and at its opposite side with an entrance 15$^c$ to admit the lock housing of the seal, and a baffle or guard-plate 16 opposite to said entrance which prevents direct access to the pocket and to the lock contained therein.

The two lugs 12 and 13 are arranged at opposite ends of the factory number on either the wall of the engine or the plate 8, so that the strap of the seal passed through the apertures of the lugs will extend over the number as best shown in Figure 4 of the drawings. The seal shown in its original condition in Figure 3, consists of a spherical housing 17, a lock mechanism enclosed therein, and a strap 18 of pliable metal which is fastened at one end in the housing and which at its opposite, free end is apertured to cooperate with the lock for fastening the strap in its operative position.

Inasmuch as the seal is of a type universally adopted by railroads as a protection against pilferage of the contents of their cars, it will not be necessary to give a detailed drawing or description of the locking mechanism contained in the spherical housing.

The seal is applied to the fastening by drawing the strap through the alined openings of the lugs 12, 13 and 14 until the lock housing engages the front wall of the pocket 15 as shown in the drawings. The strap is then drawn taut and doubled around the outer lug 12 and its free end is inserted through the opening 15$^a$ of the pocket into the entrance of the lock housing, for its operative engagement with the retaining members of the lock mechanism.

The strap of the seal bears the license number of the car as shown at 19, the abbreviated name 20 of the State, and the year of issue shown at 21, in stamped characters, and it will be observed that in its operative position it covers the number of the vehicle on the plate or the engine wall, with the license number of the vehicle uppermost and fully exposed. The lock of the seal is so constructed that after the end of the strap is fastened therein, it cannot be detached without destroying the housing and the lock mechanism or cutting the strap outside the housing, and removal and subsequent replacement of the strap for fraudulent alteration or mutilation of either number is therefore practically impossible. The pocket and the thereto opposed guard-plate protect the locking element of the seal so as to prevent of its being opened and subsequently repaired and the stretched condition of the strap of the seal frustrates any attempt to remove the seal and then replace it by shortening the strap.

Having thus described the mechanical elements of the identification system, I desire it understood that variations in the form and arrangement of the members of the fastening may be made without departing from the spirit of the invention and that if necessary the lug 13 or the guard-plate 16 may be omitted without serious impairment of the efficiency of the device. It will furthermore be apparent that for the single purpose of protecting the vehicle number against alteration or mutilation a seal having a plain strap without numbers or other identification marks may be effectively employed.

The seal being usually concealed under the hood of the vehicle, is not a substitute for the ordinary license tag but functions as an auxiliary for the detection of theft in case the vehicle is driven with a license plate bearing a number which does not correspond with that on the strap of the seal.

Having thus described my invention what I claim and desire to secure by Letters Patent is:—

1. In a system of identifying motor-vehicles, the combination with a part of the vehicle bearing an identification mark, of an element adapted to normally cover said mark, and means adapted to lock said element to said part and over the mark, so as to prevent removal of the element without its irreparable destruction.

2. In a system of identifying motor-vehicles, the combination with a vehicle-part bearing an identification mark in irremovable relation thereto, of a protective element irreplaceably locked on said part over the mark so as to prevent its alteration or mutilation with the element in place.

3. In a system of identifying motor-vehicles, the combination with a part of the vehicle, bearing an identification mark, of a protective element bearing identification data irreplaceably locked on said part over the mark.

4. In a system of identifying motor-vehicles, the combination with a fixed part on the vehicle, bearing an identification mark and having apertured lugs at opposite sides of the mark, of a strap passed through the apertures of the lugs, and a lock adapted to secure the strap so as to prevent its displacement or removal from the lugs without irreparable destruction.

5. In a system of identifying motor-vehicles, the combination with a fixed part on the vehicle, having apertured lugs, of a seal comprising a pliable strap provided with identification data and adapted to pass through the apertures of the lugs, and a lock adapted to inseparably fasten the ends of the strap together, one of said lugs having a pocket to receive the lock.

6. In a system of identifying motor-vehicles, the combination with a fixed part on the vehicle, having apertured lugs, of a seal comprising a pliable strap provided with identification data and adapted to pass through the apertures of the lugs, and a lock adapted to inseparably fasten the ends of the strap together, one of said lugs having a pocket to receive the lock, and the vehicle part having a guard-plate obstructing entrance to the pocket.

7. In a system of identifying motor-vehicles, a plate having apertured lugs and adapted to be permanently fastened to a fixed part of the vehicle, the plate having an opening between the lugs to expose a number on said part, and a seal comprising a strap adapted to pass through the apertures of the lugs and bearing identification data, and a lock to inseparably fasten the ends of the strap together.

8. In a system of identifying motor vehicles, the combination with a part on the vehicle having alined apertured lugs one of which has a pocket, of a lock in the pocket, and an identifying element passed through the apertures of the lugs and secured by the lock.

9. In a system of identifying motor vehicles, a plate adapted to be fixed on a part of the vehicle and having alined apertured lugs one of which has a pocket, a lock in the pocket, and an identifying element passed through the apertures of the lugs and secured by the lock.

10. In a system of identifying motor vehicles, the combination of an element bearing an identification number and having lugs at opposite ends thereof, an identifying member supported in said lugs in spaced relation to the surface of the element, and a locking means co-operating with one of the lugs to hold said member in a substantially taut condition and to secure it against removal without irreparable destruction.

11. In a system of identifying motor vehicles, the combination of an element bearing an identification mark, apertured lugs at opposite ends thereof, a lock on one of the lugs, and a member passed through the apertures of the lugs over the identification mark and secured by the lock against removal without irreparable destruction.

In testimony whereof I have affixed my signature.

CHARLES S. RAILSBACK